Sept. 7, 1965
W. J. RICHMOND
3,204,749
SELECTING METHOD AND APPARATUS
Filed April 25, 1963
3 Sheets-Sheet 1
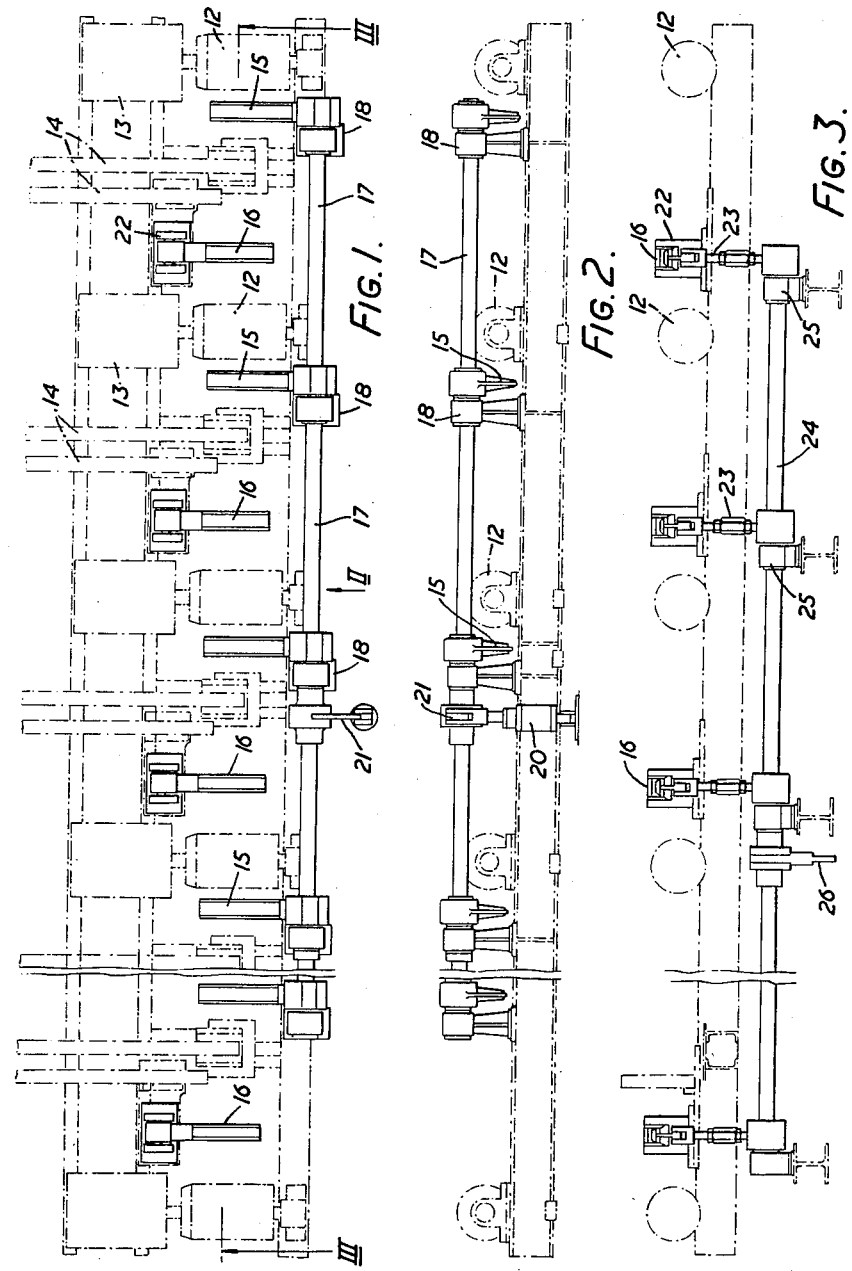
INVENTOR
WILLIAM J. RICHMOND
BY
HIS ATTORNEY Sept. 7, 1965  W. J. RICHMOND  3,204,749
SELECTING METHOD AND APPARATUS Filed April 25, 1963  3 Sheets-Sheet 2

INVENTOR
WILLIAM J. RICHMOND
BY
*Henry C. Westin*
HIS ATTORNEY

Sept. 7, 1965 W. J. RICHMOND 3,204,749
SELECTING METHOD AND APPARATUS
Filed April 25, 1963 3 Sheets-Sheet 3

INVENTOR
WILLIAM J. RICHMOND
BY
*Henry C. Westin*
HIS ATTORNEY 3,204,749
SELECTING METHOD AND APPARATUS
William James Richmond, Sheffield, England, assignor to Davy and United Engineering Company Limited, Sheffield, England
Filed Apr. 25, 1963, Ser. No. 275,773
Claims priority, application Great Britain, Apr. 27, 1962, 16,160/62
7 Claims. (Cl. 198—30)

This invention relates to a method and apparatus for selecting an element or elements from a batch of such elements. The invention is particularly applicable to the selection of billets singly from a batch of billets, in order that each may be rejected or retained according to its condition.

An object of the present invention is to facilitate the selection of elements from a batch of such elements.

Another object of the present invention is to select billets singly from a batch and direct them individually to the charging conveyor or the reject table, according to whether they are good or faulty.

In the present invention, one or more elements are selected from a batch of said elements by feeding the batch to a conveying surface, aligning the elements on the conveying surface and spacing one or more elements at one end of the batch from the remaining elements, temporarily lifting those remaining elements from the conveying surface, and, while those elements are so lifted, removing the end element or elements by operation of the conveying surface, and then repositioning the formerly raised elements for selection as before or for removal together. The aligning and spacing of the elements is preferably effected by raising all the elements on tilting arms so that they slide against a stop with the element which is in contact with the stop angularly disposed relative to the other elements, and then replacing all the elements on the conveying surface.

By aligning and spacing the elements as described, the subsequent lifting of only the non-selected element is facilitated, thereby ensuring that only the selected element or elements is or are removed.

The invention will be more readily understood from the following description of one embodiment thereof, given by way of example only, with reference to the accompanying drawings of which:

FIGURE 1 is a plan view of the billet separating mechanism,

FIGURE 2 is a side view of the mechanism in the direction of the arrow II of FIGURE 1, FIGURE 3 is a section on the line III—III of FIGURE 1, FIGURES 4 to 7 diagrammatically show two arms of the mechanisms in four successive positions.

Figure 4:
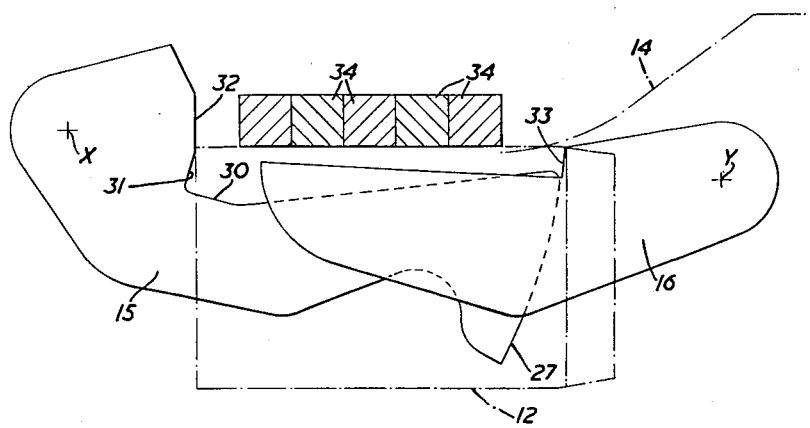

The billet selecting mechanism is arranged in conjunction with a roller table for the billets, the rollers of that table being shown in the drawings at 12 and the motors for the rollers at 13. The billets are conveyed to the roller table on slides 14 which are interposed between successive rollers 13.

The billet selecting mechanism itself consists of two sets of arms 15, 16, one arm of each set being located between each pair of rollers 12. The number of arms 15, 16 in each set is dependent on the nature of the billets, but six arms for each set is illustrated. The arms 15 are carried on a common drive shaft 17 which extends at the non-drive side of the rollers 12 and which is journalled in bearings 18. It is reciprocated as will be described hereinafter by a double acting hydraulic ram 20 coupled to a lever 21 fast on shaft 17. The arms 16 of the second set are independently pivotally mounted in blocks 22 and are rotated by couplings 23 eccentrically pivoted to a common drive shaft 24 which passes under the motors 13 and is journalled in bearings 25. A further double acting hydraulic ram diagrammatically indicated at 26 reciprocates shaft 24 as required.

FIGURES 4 to 7 show the form of the arms 15, 16 in greater detail, the axis of rotation being indicated at X, Y respectively. The arms 15, 16 are arranged so that both sets are below the level of the working surface of the rollers 12 when the arms are in the neutral positions shown in FIGURE 4; the arms may however be pivotally raised above the level of the rollers by appropriate operation of the rams 20, 26.

The arms 15 extend across substantially the whole width of the roller table and have arcuate end surfaces 27. The upper face of each arm 15 includes a flat surface 28 down which billets can slide when the arm is raised, and an adjacent surface 30 making an angle of slightly greater than 25° with the surface 28. The surface 30 remains below the level of the rollers 12 even when the arm is raised to its uppermost position shown in FIGURE 5, that is through about 25° from its neutral position illustrated in FIGURE 4.

Figure 5:
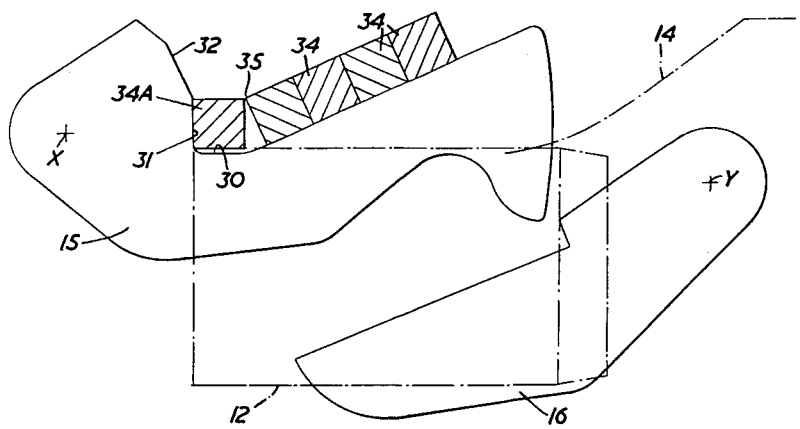
Figure 6:
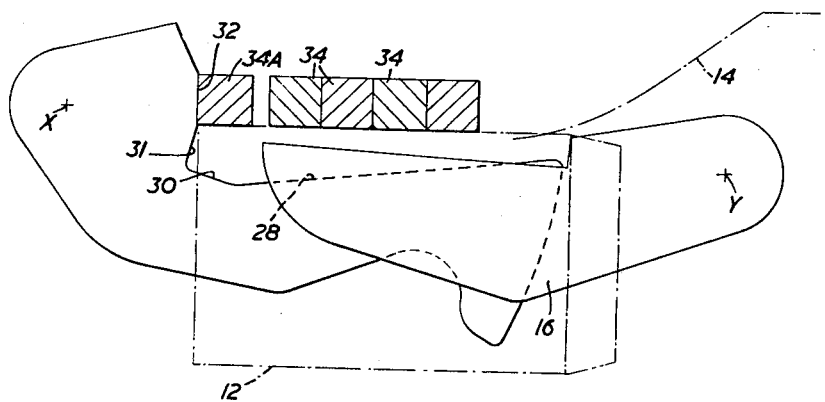

The surface 30 forms a right angled corner with a surface 31, which is arranged to be vertical when the arm is in its uppermost position (FIGURE 5). The surface 31 is extended upwardly to form a stop 32 which is always above the level of the rollers.

The arms 16 extend across the roller table to a position which is slightly greater than the width of one billet from the surface 31 in its uppermost position, and has an upright surface 33 to prevent billets sliding off the arm when it is raised.

Figure 7:
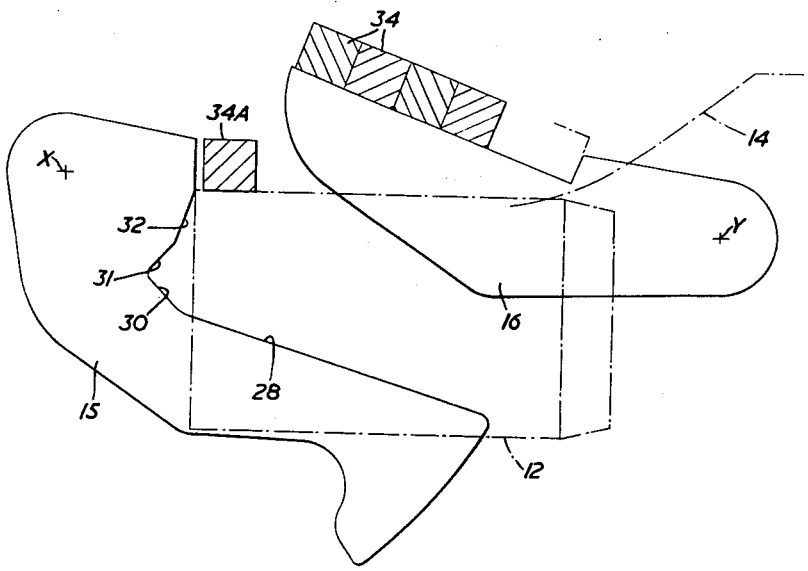

In operation a batch of billets 34 are discharged down chute 14 on to the roller table in a direction transverse to the roller table, while the arms 15, 16 are in their neutral positions shown in FIGURE 4. The stop 32 prevents the billets from overshooting the table. The hydraulic rams 20, 26 are put into operation so that, as shown in FIGURE 5, the arms 16 are lowered and arms 15 are pivoted upwards through about 25°. As the arms 15 rise, the billets 34 slide down the arms until the first billet 34A abuts the then vertical face 31, while still supported by the rollers 12. The remaining billets are tilted through 25° so that the second billet engages the first billet 34A only at its top corner 35. As soon as the arms 15 reach the position of FIGURE 5, they are lowered and pass through their neutral position shown in FIGURE 6 so that the billets are replaced on the roller table but spaced apart from the first billet 34A, as illustrated in that figure. Thereafter the arms 16 rise above the level of the roller table and lift all the billets 34 except the first billet 34A off the table; this stage is illustrated in FIGURE 7. The motion of the shafts 17, 24 is discontinued in this position and the rollers 12 are set in motion in the required direction to deliver the billet 34A to the charging conveyor or to discard it. When this occurs, the rams 20, 26 are put into operation again to lower the arms 16 and to replace the remaining billets on the table. The cycle is then repeated until all the billets have been dealt with.

If billets should arrive down chute 14 while the arms 15 are raised the arcuate form of surfaces 27 stop them without causing fouling of the arms.

If the billets ejected on to the table are seen to be all acceptable the selector mechanism need not be used as the billets can be discharged from the table together.

The operation of the rams 20, 26 may be controlled by a positional control system to ensure that in each cycle the arms 15, 16 perform the movements described. In place of the rams 20, 26, electric motors driving through reduction gears and controlled by limit switches may be used. The arms 15, 16 may be driven by a single drive shaft through individual push rods.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A method of selecting at least one element from a batch of similar elongate elements comprising the steps of feeding a batch of the elements on to a conveying surface, aligning said elements with their length substantially parallel to the conveying direction and spacing at least one end element from the other said elements, raising all said other elements off said conveying surface, removing said at least one end element by said conveying surfaces while said other elements are raised, and subsequently repositioning said other elements on said conveying surface.

2. A selecting method according to claim 1 in which the elements are aligned and spaced by tiltingly raising them off the conveying surface, so that the elements slide against a stop with the end element angularly disposed relative to the other elements.

3. Apparatus for selecting at least one element from a batch of similar elements comprising a conveyor into which the elements are delivered, positioning means located at a given position relative to the conveyor, a first set of at least two arms mounted for movement together about a first axis located on one side of the conveyor between a retracted position below the surface of the conveyor and an elevated position in which the operative surfaces of the arms are above the surface of the conveyor and are inclined to the horizontal, whereby the elements are caused to slide down said arms against the positioning means, a second set of at least two arms mounted about a second common axis for pivotal movement together through the conveyor and between a retracted position and an elevated position respectively below and above the surface of the conveyor, said second axis being disposed on the side of the conveyor opposite that of the first axis, the said second set of arms being so arranged that on upward movement they lift off the conveyor some of the elements but not that element located against the positioning means.

4. Selecting apparatus according to claim 3 in which the positioning means are constituted by surfaces on the first set of arms upwardly inclined relative to the element-receiving surfaces of those arms and located above the surface of the conveyor.

5. Selecting apparatus according to claim 4 in which the element-receiving surface of each arm of the first set has adjacent the positioning surface a first surface to receive the end element only and a second surface to receive the other elements, the first and second surfaces being mutually inclined so that on raising and lowering the arms of the first set the end element becomes spaced from the other elements, and the lengths of the arms of the second set being such that on movement to the elevated position the other elements only are raised.

6. Selecting apparatus according to claim 3 in which the two sets of arms are coupled to drive means such that on movement of the arms of one set towards the elevated position the arms of the other set are moved towards the retracted position, and vice versa.

7. Selecting apparatus according to claim 3 in which the conveyor comprises a series of rollers between which the arms are located, the surface of the conveyor being the plane through the upper edges of the rollers.

References Cited by the Examiner

UNITED STATES PATENTS 2,769,523  11/56  Ochwat _____ 198—34

SAMUEL F. COLEMAN, *Primary Examiner.*

EDWARD A. SROKA, *Examiner.*